US009463466B2

(12) United States Patent
Decherd

(10) Patent No.: US 9,463,466 B2
(45) Date of Patent: Oct. 11, 2016

(54) TRASH DRYING ASSEMBLY

(71) Applicant: David Mark Decherd, Fort Myers, FL (US)

(72) Inventor: David Mark Decherd, Fort Myers, FL (US)

( * ) Notice: Subject to any disclaimer, the term of this patent is extended or adjusted under 35 U.S.C. 154(b) by 0 days.

(21) Appl. No.: 13/998,445

(22) Filed: Nov. 1, 2013

(65) Prior Publication Data

US 2015/0122923 A1 May 7, 2015

(51) Int. Cl.

*B09B 3/00* (2006.01)
*F26B 21/00* (2006.01)
*B02C 21/00* (2006.01)
*B02C 23/08* (2006.01)
*B02C 23/18* (2006.01)
*F26B 5/08* (2006.01)

(52) U.S. Cl.

CPC ............... *B02C 21/00* (2013.01); *B02C 23/08* (2013.01); *B02C 23/18* (2013.01); *F26B 5/08* (2013.01)

(58) Field of Classification Search

CPC .......... B01D 33/0009; B01D 33/0016; B01D 33/0019; B01D 33/11; B02C 18/0084; B02C 23/16; B02C 13/00; B02C 13/288; B02C 15/001; B02C 21/00; B01J 8/38; B04B 3/02; H01L 21/67034; F26B 17/20; B09B 3/00

USPC ....... 241/24.11, 49, 57, 79; 34/322, 58, 184, 34/187; 210/360.1, 380.1, 380.3, 497.01, 210/499

See application file for complete search history.

(56) References Cited

U.S. PATENT DOCUMENTS

| | | | | |
|---|---|---|---|---|
| 2,106,851 | A * | 2/1938 | Nordell | 210/173 |
| 5,193,753 | A * | 3/1993 | Menges | 241/43 |
| 5,320,286 | A * | 6/1994 | Chambers et al. | 241/46.02 |
| 6,136,590 | A * | 10/2000 | Kruse | 435/262 |
| 6,190,566 | B1 * | 2/2001 | Kolber | 210/744 |
| 6,938,357 | B2 * | 9/2005 | Hauch | 34/168 |
| 7,662,347 | B2 * | 2/2010 | Heidel | 422/184.1 |
| 8,192,634 | B2 * | 6/2012 | Gilles | 210/781 |
| 2005/0051646 | A1 * | 3/2005 | Horne | 241/23 |

* cited by examiner

*Primary Examiner* — Faye Francis
*Assistant Examiner* — Onekki Jolly

(57) ABSTRACT

A rotating tapering cone or tube is used for separating liquid from trash. The cone or tube is constructed of either a wire mesh or parallel slats. The cone or tube is located in a complete trash disposal system. At the front of the system there is a trash intake funnel which delivers the trash to a device for shredding the trash which will deliver the shredded trash to the tapered cone including a high speed air stream. The tube is rotated at a high rate of speed whereby any fluid in the shredded trash will be expelled through the surface of the tube by way of a centrifugal and an intensive air speed.

3 Claims, 2 Drawing Sheets

TRASH DRYING ASSEMBLY

BACKGROUND OF THE INVENTION

There are various types of trash and other materials that are being dried prior to a complete disposal including the use of centrifugal devices. A search of the prior art revealed the following attempts for this endeavor.

U.S. Pat. No. 629,537 uses a centrifugal separator for the separation in milk processing and other substance.

U.S. Pat. No. 4,970,970 discloses a lower rotating tumbler including a meshed screen for combustion.

U.S. Pat. No. 6,793,013 uses a polygonal heat exchange chamber including a lower tapered section.

U.S. Pat. No. 6,802,890 discloses a centrifugal separator assembly which is attached to a fluidized bed chamber. It is a method of separating solid particles from exhausted gas.

U.S. Pat. No. 6,938,357 teaches the use of a centrifugal separator that employs forced air applied in the direction which is opposite the travel of the pellets.

U.S. Pat. No. 6,938,780 discloses a centrifugal separator for separating particles from gas including a gas vortex.

U.S. Pat. No. 7,065,826 shows a method of using a dirt separation and collection chamber for use in a bag less vacuum cleaner.

U.S. Pat. No. 7,520,249 discloses the use of a circulating fluidized bed reactor including a combustion sub-chamber and a cooling sub-chamber. A centrifugal separator receives a flue gas.

U.S. Pat. No. 8,192,634 teaches the use of a separator screen in the use of a centrifugal basket.

U.S. Pat. No. 8,506,665 discloses a centrifugal separator assembly including a polygonal separator chamber formed of planar wall sections joined to each other to provide a substantially gas tight chamber.

BRIEF DESCRIPTION OF THE INVENTION

The inventive concept avoids the use of any heating medium which by its nature increases the cost of operating any machinery including the separation of fluid from trash. The disclosed and claimed system is a compact system in that trash "as is" is introduced at the beginning of the process. The trash is fed into a shredding device and then fed into a tapered tube having a rotating fluid expulsion tube therein. With the introduction of the shredded trash into the rotating mesh tube, high velocity air is also introduced which is instrumental in the forward movement of the shredded trash while at the same time any prevailing fluid is expelled from the tapered and rotating wire mesh tube. The expelled fluid is collected and fed from the system by way of pipeline. The dried trash is also expelled from the rotating mesh at its other end.

DETAILED DESCRIPTION OF THE INVENTION

Figure 1:
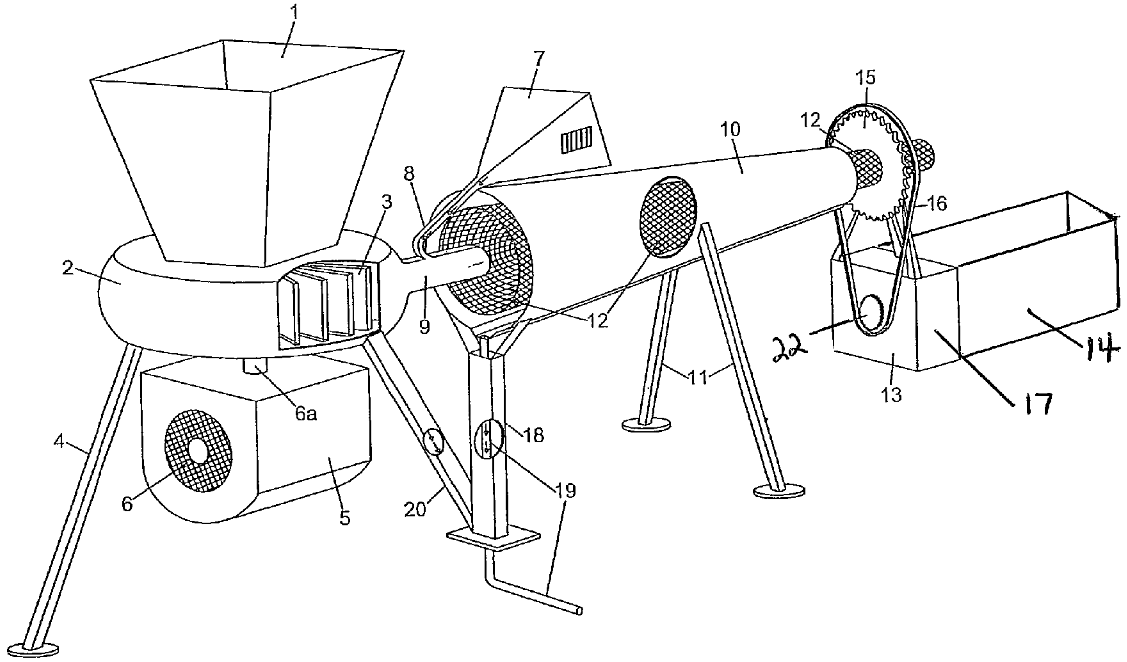
FIG. 1 is perspective view of the overall system.

FIG. 1 shows the total system in a perspective view. The trash is introduced into the system at its front end by way of a tapered chamber 1. Below the chamber 1 there is a shredder implement 3 located in a housing 2. The shredder implement 3 is driven by the motor 6 in motor housing 5. The shredder implement is driven by the motor 6 by way of the drive shaft 6*a*. The motor 6 also drives a fan located within the housing 5. The air created thereby is pushed into the shredder implement 3 together with the shredded trash into the rotating tapered tube 12 by way of the tube 9. Additional air pressure is created in the air fan housing 7 and is also delivered into the tapered tube 12 by way of the tube 8 which is the same as delivery tube 9. The tapered tube 12 is a tapered expulsion tube which throws the liquid located within the shredded trash outwardly by centrifugal force through the mesh screen which forms the tapered tube 12 and the fluid is collected within the tapered tube housing 10. The collected fluid within the housing 10 moves at the bottom of the housing into a delivery tube 18 which is located in the support leg 10. Any fluid that is collected within the shredder housing during the shredding process 2 is delivered out of the housing 2 by the tube 20. The leg 4 and the fluid tube 20 form a support for the housing 2. Any trash residue which has been freed of its fluid is delivered to the end of the tapered tube 12 into the container or receptacle 14. The receptacle 14 also has located therein the motor housing 13 and the motor 14 which drives the tapered fluid expulsion tube by of the pulleys 14 and 15 and the drive belt 16. The tapered tube housing 10 is supported by its legs 11.

Figure 2:
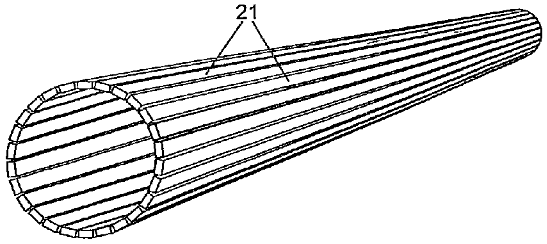
FIG. 2 is a perspective view of a differently constructed fluid expulsion tube.

FIG. 2 illustrates a different embodiment of the tapered expulsion of fluid tube 12 which in this example is made up of parallel slats instead of a wire mesh.

Figure 3:
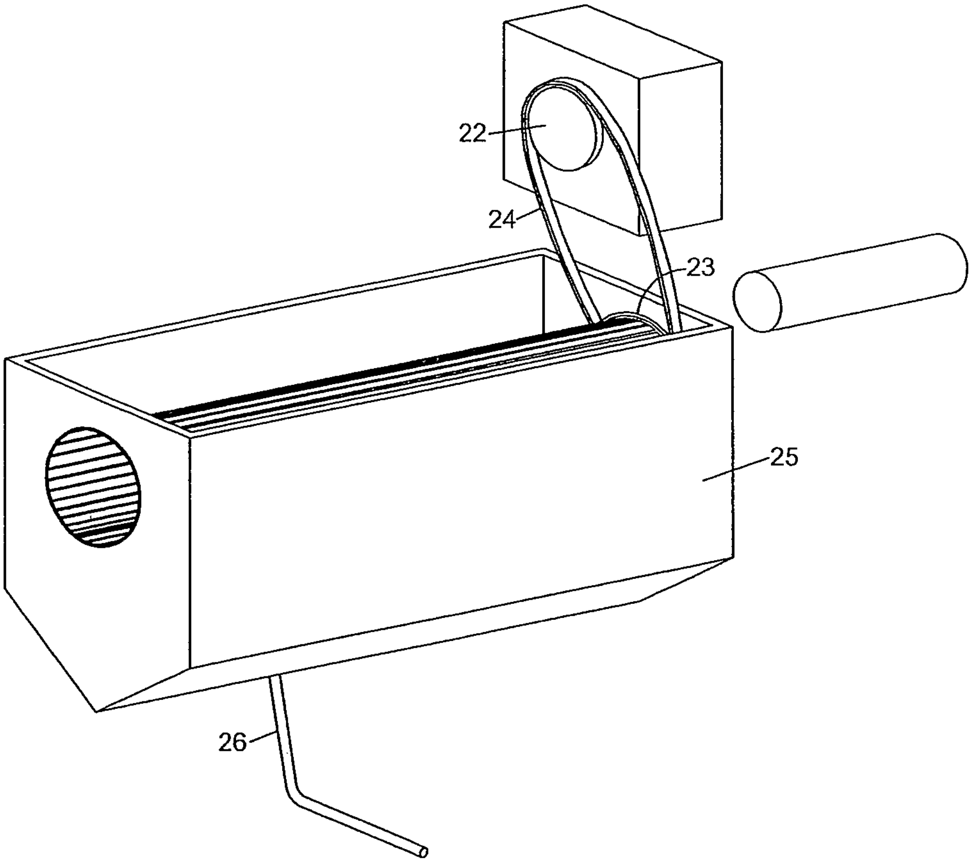
FIG. 3 illustrates a different embodiment of in the use of collecting the expulsed fluid.

FIG. 3 shows a different embodiment of the fluid collecting area. Instead of a tapered housing surrounding the expulsion tube 12, this embodiment consists of a chamber 25. In the top of the chamber 5 there is located the rotating expulsion tube 12 which is rotated by the motor driving the pulley 22 and the pulley 23 by way of drive belt 24. The shredded trash is delivered to the tube 12 at its right end and high speed rotating expulsion tapered tube 12 delivers the trash through the other end of tapered tube 12 on the left side into a collection bin. The bottom of the housing 25 is tapered downwardly so that the freed fluid can exit into the pipe 26.

What I claim is:

1. A trash drying system consisting of a trash intake, said trash intake delivers the trash to a shredder located within a shredder housing, means for delivering the shredded trash into a tapered expulsion tube rotating at high speed, means for creating a high speed air stream by a fan motor including means for delivering said air stream into said tapered expulsion tube, said tapered expulsion tube having a mesh surface, any fluid present in said shredded trash will be expelled through said mesh surface by way of a centrifugal force and a high air pressure.

2. The trash drying system of claim 1, wherein said mesh surface is a wire mesh surface.

3. The trash drying system of claim 1, wherein said mesh surface is constructed of parallel slats.

* * * * *